(12) United States Patent
Takeda et al.

(10) Patent No.: US 7,391,029 B2
(45) Date of Patent: Jun. 24, 2008

(54) RADIATION DETECTING APPARATUS, PRODUCING METHOD THEREFOR AND RADIATION IMAGE PICKUP SYSTEM

(75) Inventors: Shinichi Takeda, Honjo (JP); Yoshihiro Ogawa, Tokyo (JP); Masato Inoue, Kumagaya (JP); Satoshi Okada, Zama (JP); Tomoyuki Tamura, Yokoyama (JP); Kazumi Nagano, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 201 days.

(21) Appl. No.: 11/198,229

(22) Filed: Aug. 8, 2005

(65) Prior Publication Data
US 2006/0033031 A1 Feb. 16, 2006

(30) Foreign Application Priority Data
Aug. 10, 2004 (JP) ............... 2004-233423

(51) Int. Cl.
*G01T 1/20* (2006.01)
*G01T 1/24* (2006.01)

(52) U.S. Cl. .................. 250/370.11; 250/370.09; 250/484.4; 257/432; 216/25

(58) Field of Classification Search ......... 250/580–586, 250/370.11, 484.4, 370.09; 257/432; 216/25
See application file for complete search history.

(56) References Cited

U.S. PATENT DOCUMENTS

| | | | | |
|---|---|---|---|---|
| 5,107,125 A * | 4/1992 | Powell et al. | ............ | 250/483.1 |
| 5,132,539 A | 7/1992 | Kwasnick et al. | | |
| 5,942,756 A * | 8/1999 | Tran | ............ | 250/370.09 |
| 6,133,614 A * | 10/2000 | Shoji et al. | ............ | 257/443 |
| 6,146,489 A * | 11/2000 | Wirth | ............ | 156/280 |
| 6,262,422 B1 * | 7/2001 | Homme et al. | ............ | 250/370.11 |
| 6,354,595 B1 * | 3/2002 | Vieux et al. | ............ | 277/312 |
| 6,891,164 B2 * | 5/2005 | Suzuki | ............ | 250/370.11 |
| 2002/0050570 A1 * | 5/2002 | Isoda | ............ | 250/484.4 |
| 2002/0121606 A1 * | 9/2002 | Okada et al. | ............ | 250/370.11 |
| 2002/0162965 A1 * | 11/2002 | Okada et al. | ............ | 250/370.11 |
| 2004/0094719 A1 * | 5/2004 | Ogawa et al. | ............ | 250/370.11 |

(Continued)

FOREIGN PATENT DOCUMENTS

JP 05-242841 A 9/1993

*Primary Examiner*—David P. Porta
*Assistant Examiner*—Casey Bryant
(74) *Attorney, Agent, or Firm*—Fitzpatrick, Cella, Harper & Scinto (57) ABSTRACT

A radiation detection apparatus including a sensor panel, having a photoreceiving unit constituted of plural photoelectric converting elements two-dimensionally arranged on a substrate and electrical connecting portions provided in an external portion of the photoreceiving unit and electrically connected to the photoelectric converting elements of respective rows or columns of the photoreceiving unit, a phosphor layer provided at least on the photoreceiving unit for converting a radiation into a light detectable by the photoelectric converting element, and a phosphor protective member covering the phosphor layer and in contact with the sensor panel, characterized in that the phosphor protective member includes a frame member provided between the phosphor layer and the electric connecting portion on the sensor panel, and a phosphor protective layer covering an upper surface of the phosphor layer and provided in close contact with an upper surface of the frame member. This configuration allows to prevent a discharge of an electrostatic charge accumulated on the sensor panel, thereby providing a stable radiation detection apparatus with a high production yield.

12 Claims, 8 Drawing Sheets

U.S. PATENT DOCUMENTS

| | | | |
|---|---|---|---|
| 2004/0108464 A1* | 6/2004 | Fukui et al. | 250/484.4 |
| 2006/0033032 A1 | 2/2006 | Inoue et al. | 250/370.11 |
| 2006/0033040 A1 | 2/2006 | Okada et al. | 250/484.2 |

* cited by examiner

FIG. 12 excellent # RADIATION DETECTING APPARATUS, PRODUCING METHOD THEREFOR AND RADIATION IMAGE PICKUP SYSTEM

BACKGROUND OF THE INVENTION

1. Field of the Invention

The present invention relates to a scintillator panel, a radiation detecting apparatus and a radiation image pickup system adapted for use in a medical diagnostic equipment or a non-destructive inspection equipment, and particularly to a scintillator panel, a radiation detecting apparatus and a radiation image pickup system adapted for use in an X-ray image pickup. In the present specification, the radiation includes also electromagnetic waves such as α-ray, β-ray or γ-ray in addition to X-ray.

2. Description of the Related Art

For obtaining an X-ray photograph, there has been generally employed an X-ray film system including a fluorescent screen having an X-ray phosphor layer and an X-ray film coated on both sides. On the other hand, a digital radiation detection apparatus, including a phosphor layer as a wavelength converting member for converting an X-ray and a two-dimensional photodetector constituted by arranging photoelectric converting elements two-dimensionally, is an object of active research and development, and various patent applications are being made. This is based on a fact that the digital radiation detection apparatus has satisfactory image characteristics and digital data provided by such apparatus can be fetched into a computer system on a network and can provide an advantage of data sharing. Among such digital radiation detection apparatuses, an apparatus of a high sensitivity and a high sharpness is disclosed in U.S. Pat. No. 6,262,422, which describes a radiation detection apparatus formed by a photodetector (also called "sensor panel") constituted of a photoelectric converting element unit in which plural switching elements such as photosensors and TFTs (thin film transistors) are arranged two-dimensionally and by forming thereon a phosphor layer for converting a radiation into a light detectable with the photosensor.

Figure 11:
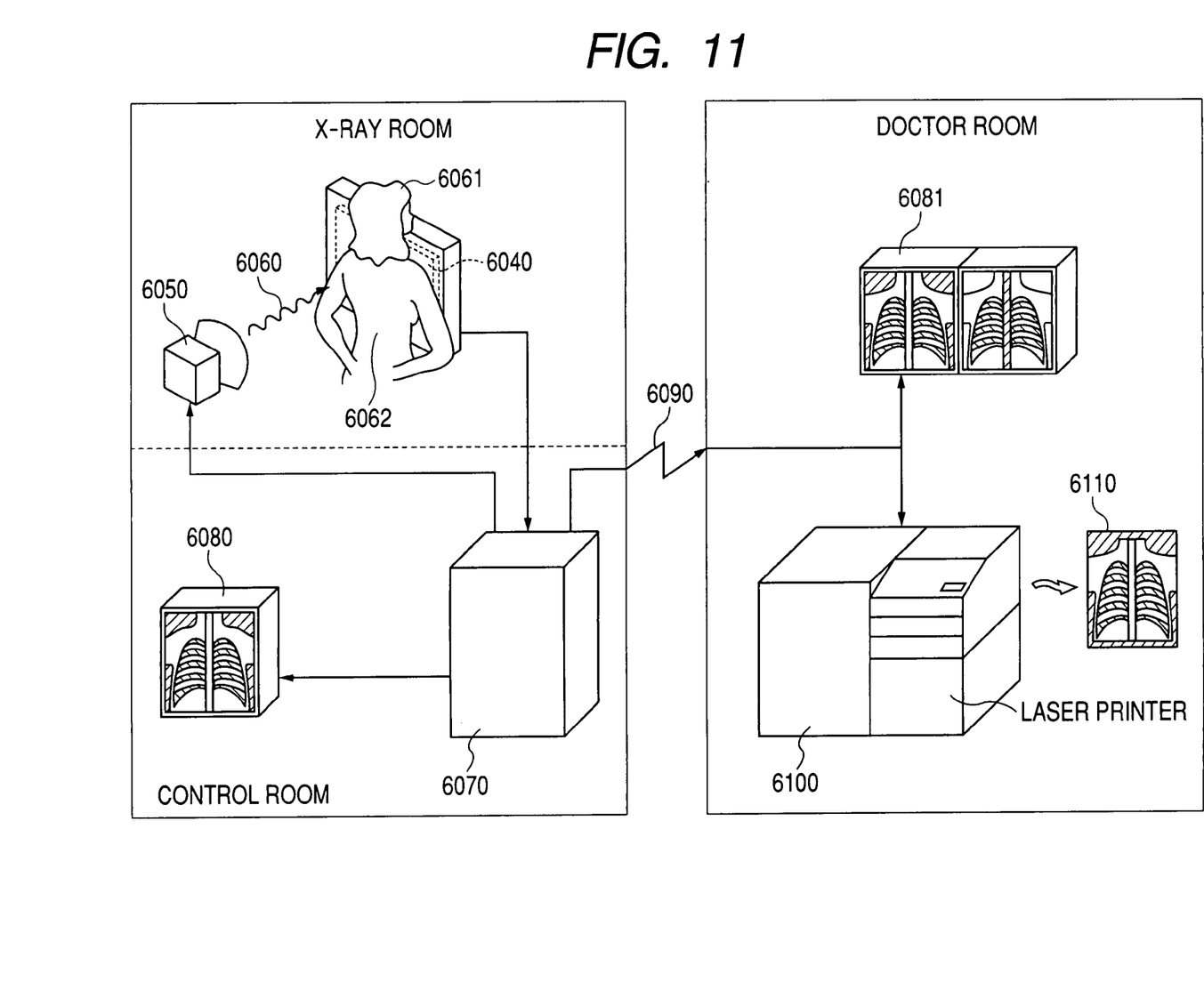
FIG. 11 is a schematic view showing a configuration of a radiation image pickup system of the invention.
Figure 12:
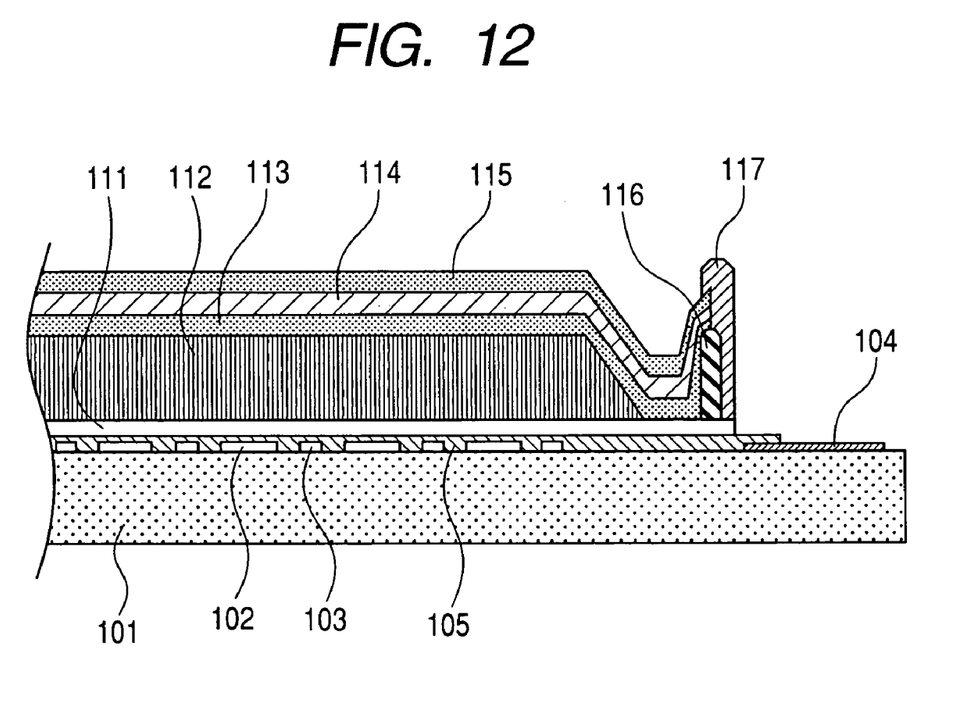
FIG. 12 is a cross-sectional view of a prior radiation detection apparatus.

FIG. 11 is a cross-sectional view showing a prior radiation detection apparatus. Also FIG. 12 is a cross-sectional view of a radiation detection apparatus in which the aforementioned phosphor layer is formed in a two-dimensional sensor panel constituted of a photoelectric converting element unit in which plural electrical elements such as photosensors and TFTs are arranged. In FIG. 12, there are shown a glass substrate 101; a photosensor 102 utilizing amorphous silicon and constituting a photoelectric converting unit with a TFT; a wiring 103; a connection lead 104; a sensor protective layer (first protective layer) 105 formed for example with silicon nitride; a phosphor undercoat layer (second protective layer) formed by a resinous film 111; a phosphor layer 112 formed by an alkali halide having a columnar crystal structure; a phosphor protective layer 113 and a protective layer 115 for the reflective layer formed by an organic resin; a reflective layer 114; a protective resin 116 formed on the sensor panel on an external periphery of the phosphor prior to the formation of the phosphor protective layer 113, and a sealant 117 for sealing end portions of the phosphor protective layer 113 and the reflective layer protective layer 115 to prevent a moisture intrusion from the exterior thereby improving the durability. A connection lead 104 for a connection with an external electrical circuit is connected for example to a flexible wiring board, for example with an anisotropically conductive adhesion film. These components constitute a radiation detection apparatus.

In the aforementioned prior configuration, however, in case forming the phosphor layer 12 on the sensor panel, the connection lead 104 has to be masked in order to prevent a deposition of the phosphor, constituting the phosphor layer 112, onto the connection lead 104.

In this operation, it is possible to prevent the deposition of the phosphor by so positioning a holder, used for setting the sensor panel in an apparatus for evaporating the phosphor layer, as to cover the electrical connection lead 104. However, when the holder is detached after the formation of the phosphor layer, an electrostatic charge accumulated in the sensor panel may be discharged to the holder or the like, thereby causing, through the connection lead 104, a characteristic change of the photosensor 102 or the TFT or a breakage of a wiring, formed on the sensor panel. Also a masking may be achieved by covering the connection lead with a polyimide tape or the like before the setting in the phosphor forming apparatus, but there may result, when the masking tape is peeled off after the formation of the phosphor layer, a peeling charging of the sensor panel, thereby resulting in a discharge at a contact by the panel handling and causing similar failures. Also in the aforementioned masking by the masking tape, there may result a deposition of the phosphor on the connection lead 104 because of an incomplete masking or a residue of the tape on the collection lead 104, thus requiring a rinsing step of the connection lead 104 with a solvent or the like, thus increasing the manufacturing operations.

Also in the aforementioned prior technology, the phosphor protective layer 113 and the protective layer 115 for reflective layer are formed by a CVD (gaseous growth) method requiring a vacuum evaporation apparatus, but such process necessitates an expensive apparatus and a very long forming time, leading to a high cost.

SUMMARY OF THE INVENTION

The aforementioned drawbacks can be resolved, according to the present invention, by a radiation detection apparatus including a sensor panel, having a photoreceiving unit constituted of plural photoelectric converting elements two-dimensionally arranged on a substrate and electrical connecting portions provided in an external portion of the photoreceiving unit and electrically connected to the photoelectric converting elements of respective rows or columns of the photoreceiving unit, a phosphor layer provided at least on the photoreceiving unit for converting a radiation into a light detectable by the photoelectric converting element, and a phosphor protective member covering the phosphor layer and in contact with the sensor panel, characterized in that the phosphor protective member includes a frame member provided between the phosphor layer and the electric connecting portion on the sensor panel, and a phosphor protective layer covering an upper surface of the phosphor layer and provided in close contact with an upper surface of the frame member, and wherein the phosphor protective layer includes, on the frame member, an area which is press-adhered to the frame member.

Also a producing method of the invention is for producing a radiation detection apparatus including a sensor panel, having a photoreceiving unit constituted of plural photoelectric converting elements two-dimensionally arranged on a substrate and electrical connecting portions provided in an external portion of the photoreceiving unit and electrically connected to the photoelectric converting elements of respective rows or columns of the photoreceiving unit, a phosphor layer provided at least on the photoreceiving unit for converting a radiation into a light detectable by the photoelectric converting element, and a phosphor protective member covering the phosphor layer and in contact with the sensor panel, the method being characterized in including a step of forming a frame member between the phosphor layer and the electric connecting portion on the sensor panel, a step of forming a phosphor layer on the sensor panel in an area surrounded by the frame member, and a step of forming a phosphor protective layer so as to cover an upper surface of the phosphor layer and in close contact with an upper surface of the frame member, wherein, after the step of forming the phosphor protective layer, a step of pressing the phosphor protective layer is executed to form, in the phosphor protective layer on the frame member, an area adhered to the frame member.

According to the present invention, when a panel is set in an evaporation apparatus for forming the phosphor layer, it is so set that a holder portion constituting a masking portion is closely contacted with the frame member to execute a masking a non-forming area of the phosphor layer and a phosphor layer is deposited in this state. Such operation allows to form the phosphor layer under a masking of the connection lead and also to maintain a clearance between the connection lead on the sensor panel and the holder, thereby preventing the holder from approaching unexpectedly to the connection lead. It is thus rendered possible to prevent a discharge of the electrostatic charge accumulated on the sensor panel and to achieved a stable production with a high production yield.

Also the phosphor layer is covered by a frame member of a resin of a low moisture permeability in a lateral portion and by a phosphor protective layer provide on the upper surface, whereby a reliability against the moisture permeation can be secured by a simple structure. Also the phosphor protective layer can be prepared within a short time in an inexpensive apparatus, by employing a hot-melt resin. Therefore a radiation detection apparatus of a low cost can be obtained.

According to another object of the present invention, there is provided a producing method for a radiation detection apparatus comprising a step, on a sensor panel having a photoreceiving unit constituted of plural photoelectric converting elements two-dimensionally arranged on a substrate and electrical connecting portions provided in an external portion of the photoreceiving unit and electrically connected to the photoelectric converting elements of respective rows or columns of the photoreceiving unit, of forming a frame member between the photoreceiving unit and the electrical connecting portions; a step of forming a phosphor layer, for converting a radiation into a light detectable by the photoelectric converting elements, on the sensor panel in an area surrounded by the frame member; and a step of forming a phosphor protective layer so as to cover an upper surface of the phosphor layer and in close contact with an upper surface of the frame member, wherein the step of forming the phosphor layer of the columnar crystalline structure is executed by positioning a mask member, for masking an area other than the forming area of the phosphor layer, in such a manner that the mask member is supported by the frame member.

According to yet another aspect of the present invention, there is provided a radiation detection apparatus comprising a sensor panel, including a photoreceiving unit constituted of plural photoelectric converting elements two-dimensionally arranged on a substrate, and electrical connecting portions provided in an external portion of the photoreceiving unit and electrically connected to the photoelectric converting elements of respective rows or columns of the photoreceiving area; a phosphor layer provided at least on the photoreceiving unit for converting a radiation into a light detectable by the photoelectric converting element: and a phosphor protective member covering the phosphor layer and in contact with the sensor panel, wherein the phosphor protective member includes a frame member provided between the phosphor layer and the electric connecting portion on the sensor panel and a phosphor protective layer covering an upper surface of the phosphor layer and provided in close contact with an upper surface of the frame member, and wherein the phosphor protective layer includes, on the frame member, an area which of which thickness is reduced by pressing process.

According to a further aspect of the present invention, there is provided a producing method for a radiation detection apparatus comprising a step, on a sensor panel having a photoreceiving unit constituted of plural photoelectric converting elements two-dimensionally arranged on a substrate and electrical connecting portions provided in an external portion of the photoreceiving unit and electrically connected to the photoelectric converting elements of respective rows or columns of the photoreceiving unit, of forming a frame member between the photoreceiving unit and the electrical connecting portions; a step of forming a phosphor layer, for converting a radiation into a light detectable by the photoelectric converting elements, on the sensor panel in an area surrounded by the frame member; and a step of forming a phosphor protective layer so as to cover an upper surface of the phosphor layer and in close contact with an upper surface of the frame member, wherein, after the step of forming the phosphor protective layer, a step of pressing the phosphor protective layer is executed to reduce a thickness of an area of the phosphor protective layer on the frame member.

DETAILED DESCRIPTION OF THE PREFERRED EMBODIMENTS

In the following, embodiments of the present invention will be explained in detail with reference to the accompanying drawings.

Figure 1:
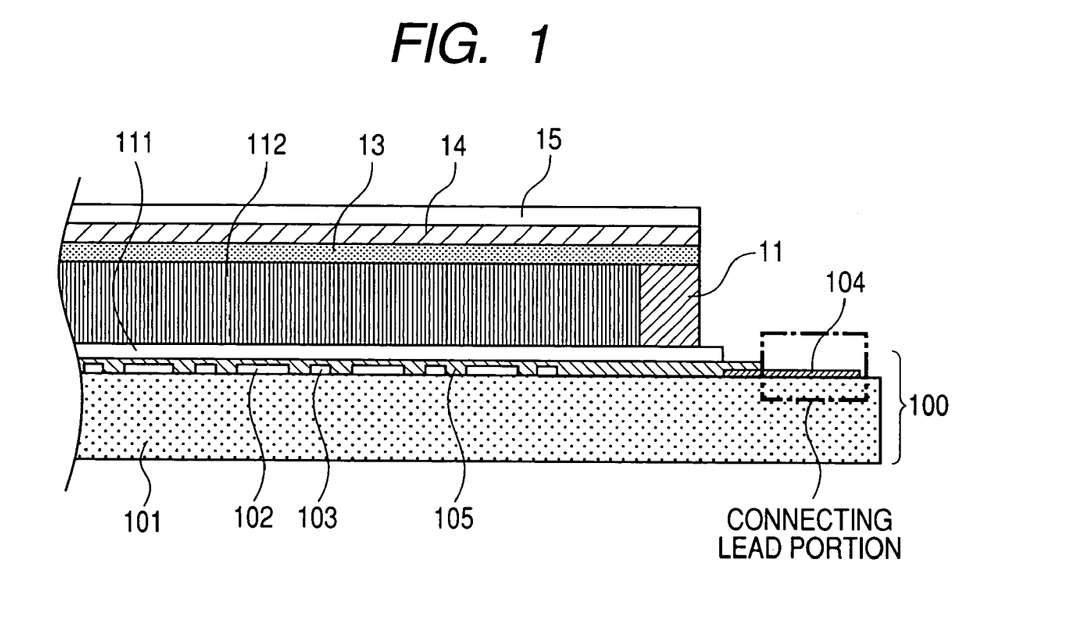
FIG. 1 is a cross-sectional view showing a radiation detection apparatus in an embodiment of the present invention.

FIG. 1 is a cross-sectional view showing a radiation detection apparatus in an embodiment of the present invention. In FIG. 1, there are shown a substrate 101 such as a glass and a photoelectric converting element 102, and plural photoelectric converting elements 102 and TFTs are arranged two-dimensionally to constitute a photoelectric converting unit (photoreceiving unit). There are also shown a wiring 103 connected to the photoelectric conversion element 102 or the TFT, a connection lead 104 such as a bonding pad connected with the wiring 3, a sensor protective layer (first protective layer) 105 formed for example by silicon nitride, and a phosphor undercoat layer (second protective layer) 111 formed by a resin film or the like and serving also for protecting the rigidity of the photoelectric converting element 102. A sensor panel 100 is constituted of these components 101-111. There are further shown a phosphor layer 112, a phosphor protective layer 13 covering an upper surface of the phosphor layer 112, a frame member 11 in contact with a lateral wall of the phosphor layer 112 and covering the external periphery thereof, a reflective layer 14, and a protective layer 15 for the reflective layer. These components 13, 11, 14 and 15 constitute a phosphor protective member. The connection lead 104 is electrically connected with a flexible wiring board or the like for example with an anisotropically conductive adhesive film thereby forming a connection with an external electrical circuit.

The substrate 101, for forming the photoelectric converting element 102, the wiring 103 and the TFT (not shown) thereon, is advantageously formed by glass or a heat-resistant plastic material.

The photoelectric converting element 102 converts a light, converted from a radiation by the phosphor layer 112, into a charge, and can be formed for example by amorphous silicon. The photoelectric converting element 102 is not particularly restricted in a structure thereof, and can be suitably formed by a MIS sensor a PIN sensor, or a TFT sensor.

The wiring 103 indicates a part of a signal wiring for reading, through a TFT, a signal photoelectrically converted by the photoelectric converting element 102, a bias wiring for applying a voltage (Vs) to the photoelectric converting element, or a driving wiring for driving the TFT. A signal subjected to a photoelectric conversion in the photoelectric converting element 102 is read by a TFT, and is outputted through a signal wiring to a signal processing circuit. Also gates of TFTs arranged in a row direction are connected, for each row, to a driving wiring, and a TFT drive circuit selects TFTs in each row.

The sensor protective layer (first protective layer) 105 can be formed by SiN, $TiO_2$, LiF, $Al_2O_3$, MgO, a polyphenylene sulfide resin, a fluorinated resin, a polyether ether resin, a liquid crystal polymer, a polyethernitrile resin, a polysulfone resin, a polyethersulfone resin, a polyallylate resin, a polyamidimide resin, a polyetherimide resin, a polyimide resin, an epoxy resin, or a silicone resin. The protective layer, transmitting the light converted by the phosphor layer 112 under the irradiation with a radiation, preferably has a transmittance at the wavelength of a light emitted by the phosphor layer 112.

The phosphor undercoat layer (second protective layer) 111 may be formed by any material that can withstand a thermal process in a phosphor layer forming step (for example 200° C. or higher in case of a phosphor layer having a column crystalline structure), such as a polyamidimide resin, a polyetherimide resin, a polyimide resin, an epoxy resin, or a silicone resin.

The frame member 11 is provided, at the evaporation of the phosphor layer 112, between a holder covering a non-evaporated surface and a non-evaporated surface of the sensor panel and in contact therewith, thereby preventing an approaching of the holder and the sensor panel. The frame member 11 also is in contact with a lateral face of the phosphor layer and serves for moisture prevention for the phosphor layer 112. Therefore, the frame member 11 defines an area for forming the phosphor layer and also functions as a protective layer for the phosphor. The frame member 11 can be formed by an ordinary organic sealing material such as a silicone resin, an acrylic resin or an epoxy resin, but there is particularly preferred a resinous material having a low moisture permeability and capable, like the phosphor undercoat layer 111, of withstanding a thermal process in a phosphor layer forming step (for example 200° C. or higher in case of a phosphor layer having a columnar crystalline structure).

The phosphor layer 112 converts a radiation into a light detectable by the photoelectric converting element 102, and is preferably constituted of a phosphor having a columnar crystal structure. The phosphor having a columnar crystal structure, in which the light generated therein is transmitted through the columnar crystals, shows little light scattering and can improve the resolution. However, the phosphor layer 112 may also be formed by a material other than a phosphor having a columnar crystal structure. As the phosphor having a columnar crystal structure, a material principally constituted of alkali halide can be advantageously employed, such as CsI:Tl, CsI:Na, CsBr:Tl, NaI:Tl, LiI:Eu or KI:Tl. Such material can be prepared, for example in case of CsI:Tl, by a simultaneous evaporation of CsI and TlI.

The phosphor protective layer 13 has a humidity preventing function of preventing a moisture intrusion from the external air to the phosphor layer 112, and an impact preventing function of avoiding a structural destruction by an impact. In case of employing a phosphor having a columnar crystal structure as the phosphor layer 112, the phosphor protective layer 13 preferably has a thickness of 20 to 200 μm. A layer of a thickness less than 20 μm may not be able to completely cover surface irregularities of the phosphor layer 112 and splash defects thereof, thereby resulting in a deterioration of the humidity preventing function. On the other hand, in case the thickness exceeds 200 μm, the light generated in the phosphor layer 112 or the light reflected in the reflective layer may be scattered more in the phosphor protective layer 13, thereby resulting a deterioration in a resolution and an MTF (modulation transfer function) of the obtained image. The phosphor protective layer 13 may be formed by an ordinary organic sealant material such as a silicone resin, an acrylic resin or an epoxy resin, or a hot-melt resin such as of polyester, polyolefin or polyamide, but a resin with a low moisture permeability is particularly desirable. The phosphor protective layer 13 can be advantageously formed by an organic film of polyparaxylylene formed by a CVD. Also the phosphor protective layer 13 can be advantageously formed by a hot-melt resin to be explained later.

The reflective layer 14 has a function of reflecting, among the light generated by the conversion in the phosphor layer 112, the light proceeding in a direction opposite to the photoelectric converting element 102 to guide such light to the photoelectric converting element 102 there by improving an efficiency of light utilization. The reflective layer 14 also has a function of shielding the photoelectric converting element 102 from the entry of the external light other than the light generated in the phosphor layer 112, thereby preventing entry of noises into the photoelectric converting element 102. The reflective layer 14 is preferably formed by a metal foil or a metal thin film, with a preferred thickness of 1-100 μm. A thickness less than 1 μm may cause pinholes at the formation of the reflective layer 14 and is also insufficient in the light shielding property. On the other hand, a thickness exceeding 100 μm causes a large absorption of the radiation, possibly leading to an increased radiation dose to which a subject person is exposed, and it may become difficult to cover, without a gap, a step difference between the phosphor layer 112 and the surface of the sensor panel. The reflective layer 14 may be formed by a metal material such as aluminum, gold, copper, or an aluminum alloy, and aluminum or gold is preferable for a higher reflectance.

The protective layer 15 for reflective layer has a function of preventing a destruction of the reflective layer 14 by an impact or an erosion by moisture thereof, and is preferably formed by a resin film. The protective layer 15 for reflective layer is preferably formed by a film material such as of polyethylene terephthalate, polycarbonate, polyvinyl chloride, polyethylene naphthalate or polyimide. The protective layer 15 for reflective layer preferably has a thickness of 10-100 μm. In the present embodiment, the phosphor protective layer 13, the reflective layer 14 and the protective layer 15 for reflective layer constitute a phosphor protective member, and the phosphor layer 13 and the phosphor protective member constitute a wavelength converting member.

A hot-melt resin to be employed as the phosphor protective layer 13 is defined as an adhesive resin constituted of a completely non-volatile thermoplastic material which is free from water or solvent, and solid at the room temperature (Thomas. P. F. Flanagan, Adhesive Age, 9, No. 3, 18(1996)). A hot-melt resin melts or solidifies as the resin temperature is elevated or lowered. The hot-melt resin shows an adhesive property to another organic or inorganic material in a heat-fused state, and shows no adhesive property in a solid state at the room temperature. The hot-melt resin, being free from a polar solvent, a solvent or water and not dissolving the phosphor layer 112 (for example a phosphor layer of alkali halide having a columnar crystalline structure) in contact therewith, can be employed as the phosphor protective layer 113. The hot-melt resin is different from an adhesive resin curable by solvent evaporation, formed by dissolving a thermoplastic resin in a solvent and by a solvent coating method. It is also different from an adhesive resin of chemical reaction type, formed by a chemical reaction such as an epoxy resin.

The hot-melt resin material is classified by the type of a base polymer (base material) constituting a principal component, and there can be utilized a polyolefin type, a polyester type or a polyamide type. Also the phosphor protective layer 13 is required to have a high moisture resistance and a high optical transmittance for the visible light generated from the phosphor. As a hot-melt resin capable of meeting the moisture resistance required for the phosphor protective layer 13, there is preferred a polyolefin resin or a polyester resin, and particularly preferably a polyolefin resin of a low moisture absorption rate. Also a polyolefin resin is preferable as a resin having a high optical transmittance. Therefore, a hot-melt resin based on a polyolefin resin is more preferable for the phosphor protective layer 13. The polyolefin resin preferably contains, as a principal component, at least one selected from an ethylene-vinyl acetate copolymer, an ethylene-acrylic acid copolymer, an ethylene-acrylate ester copolymer, an ethylene-methacrylic acid copolymer, an ethylene-methacrylate ester copolymer, and an ionomer resin. As a hot-melt resin principally formed by an ethylene-vinyl acetate copolymer, Hirodyne 7544 (manufactured by Hirodyne Industries Ltd.) can be employed; as a hot-melt resin principally formed by an ethylene-acrylate ester copolymer, O-4121 (manufactured by Kurabo Co.) can be employed; as a hot-melt resin principally formed by an ethylene-methacrylate ester copolymer, W-4110 (manufactured by Kurabo Co.) can be employed; as a hot-melt resin principally formed by an ethylene-acrylate ester copolymer, H-2500 (manufactured by Kurabo Co.) can be employed; as a hot-melt resin principally formed by an ethylene-acrylic acid copolymer, P-2200 (manufactured by Kurabo Co.) can be employed; and as a hot-melt resin principally formed by an ethylene-acrylate ester copolymer, Z-2 (manufactured by Kurabo Co.) can be employed.

Figure 2:
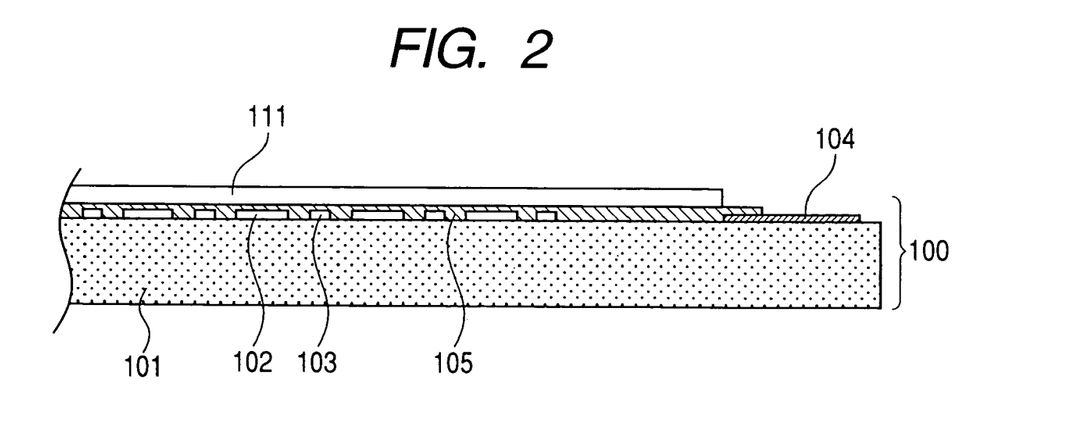
FIG. 2 is a cross-sectional view showing a producing method for a radiation detection apparatus in an embodiment of the present invention.
Figure 3:
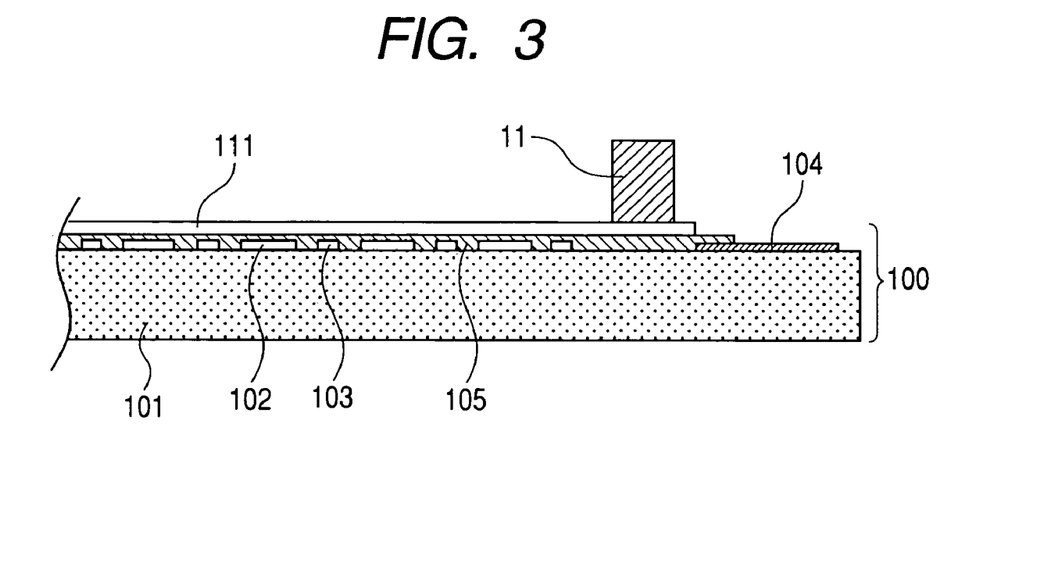
FIG. 3 is a cross-sectional view showing a producing method for a radiation detection apparatus in an embodiment of the present invention.
Figure 4:
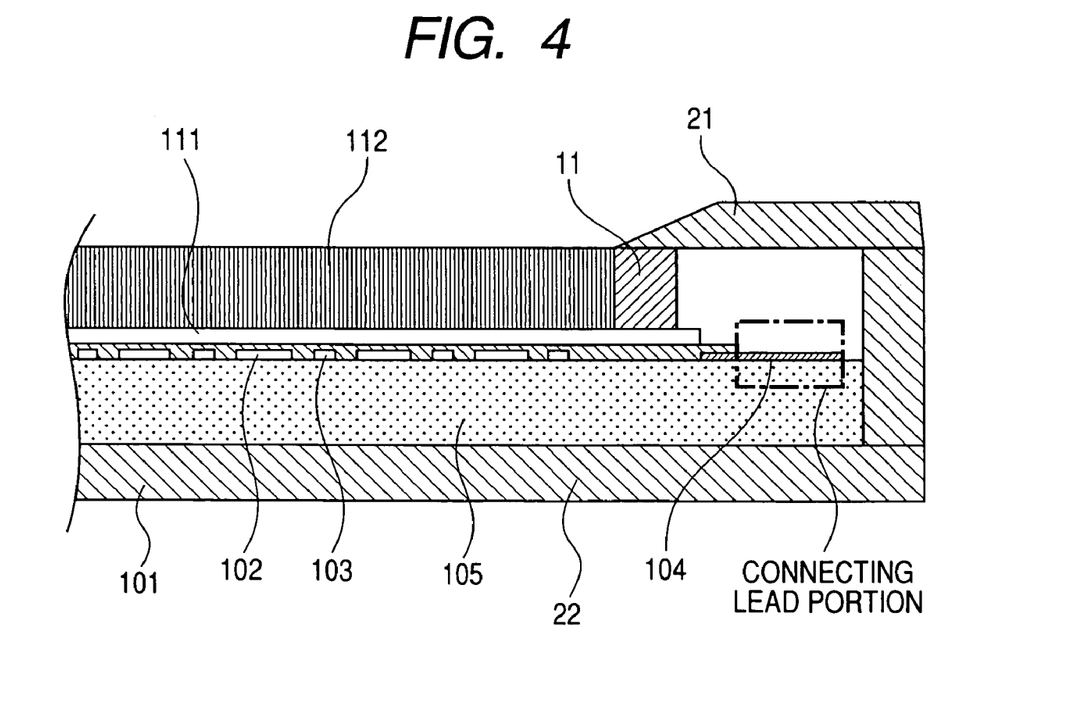
FIG. 4 is a cross-sectional view showing a producing method for a radiation detection apparatus in an embodiment of the present invention.

FIGS. 2, 3 and 4 are cross-sectional views showing a method of producing the radiation detection apparatus of the invention shown in FIG. 1.

On a sensor panel 100 (FIG. 2) constituted of components 101-105 and 111, a frame member 11 formed by the aforementioned organic material is formed, for example by a dispensing apparatus or a screen printing apparatus, in such a frame shape as to surround the two-dimensionally arranged photoelectric converting elements (FIG. 3).

Then a phosphor layer of an alkali halide phosphor of a columnar crystal structure (for example CsI:Tl (thallium-activated cesium iodide)) is formed by an evaporation apparatus for forming a phosphor layer. In this operation, the sensor panel 100 is placed on a phosphor evaporating stage, and a phosphor layer non-forming area such as the area of the connection lead 104 is masked by a holder 21 for setting in the apparatus and by the frame member 11, whereby a phosphor layer 112 is formed on a phosphor undercoat layer 111 inside the frame member 11 (FIG. 4). Then a phosphor protective layer 13 is formed on thus formed phosphor layer 112. In this operation the phosphor protective layer 13 is so formed as to be in close contact with the surface of the phosphor layer 112, and, in an external periphery, as to be in contact with a surface of the frame member 11, whereby the phosphor layer 112 is covered by the frame member 11 and the phosphor protective layer 13. Then a sheet, provided in advance with a reflective layer 14 on a protective layer 15 for reflective layer, is provided on the frame member 11 and the phosphor protective layer 13. In this manner a radiation detection apparatus of the present embodiment (FIG. 1) is obtained.

In the following, a method of forming the phosphor protective layer on the phosphor layer 112 will be explained with reference to FIGS. 5A, 5B and 5C.

Figure 5A:
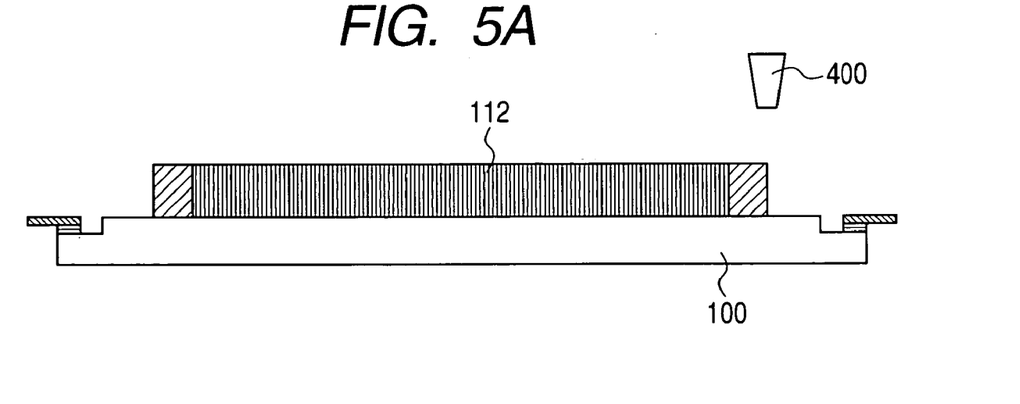
FIGS. 5A, 5B and 5C are cross-sectional views showing a method of forming a phosphor protective layer on a phosphor layer 112.
Figure 5B:
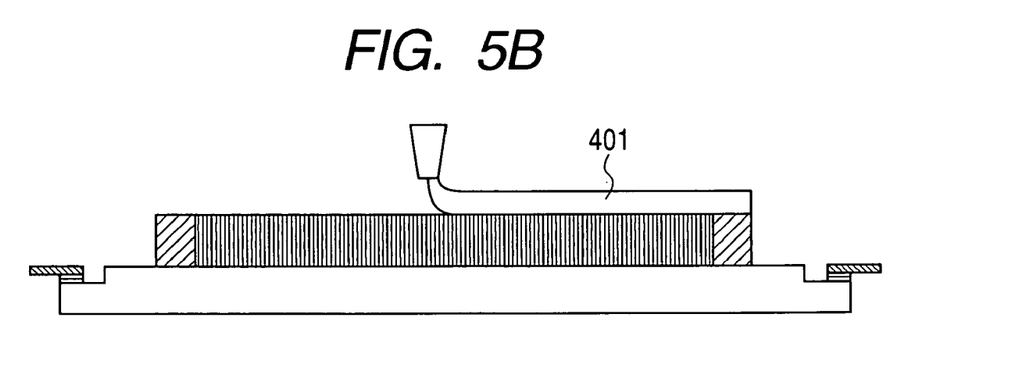
Figure 5C:
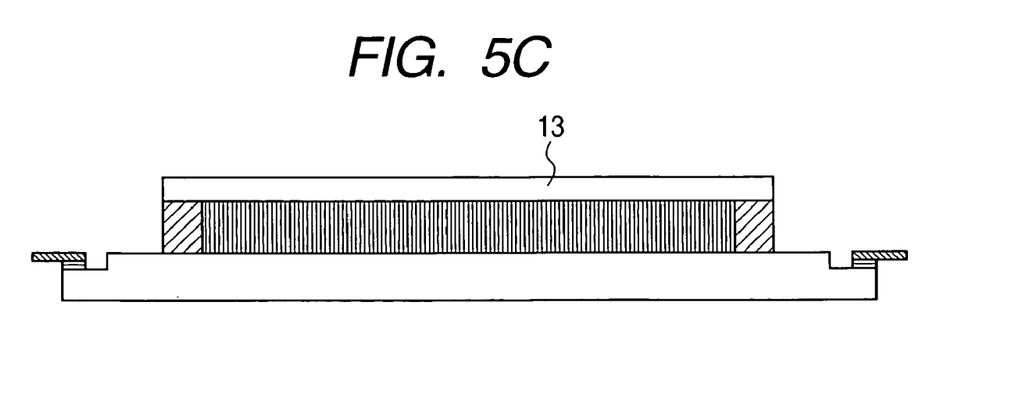

At first, as shown in FIG. 5A, a hot-melt resin 401 in a molten state is prepared in a tank (not shown) and a die coater 400, which is placed in a predetermined position above the frame member 11 of the sensor panel 100. Then, as shown in FIG. 5B, the die coater 400 is moved in a scanning motion, extruding the molten hot-melt resin 401 from a predetermined position of the frame member 11, thereby coating the upper surface of the frame member 11 and the phosphor layer 112. Then as shown in FIG. 5C, the hot-melt resin coated on the frame member 11 and the phosphor layer 112 is heat cured to obtain the phosphor protective layer 13. Then a sheet, provided in advance with a reflective layer 14 on a protective layer 15 for reflective layer, is provided on the frame member 11 and the phosphor protective layer 13 whereupon the process is terminated.

It is also possible to prepare a phosphor protecting sheet bearing a reflective layer 14 and a phosphor protective layer 13 on a protective layer 15 for reflective layer, and heat laminating such phosphor protecting sheet on the surface of the phosphor layer 7.

Figure 6A:
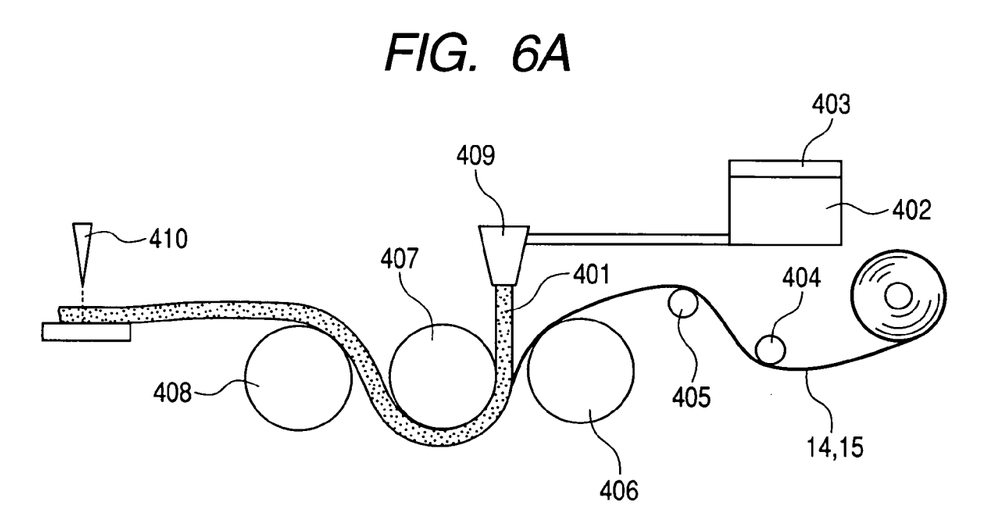
FIGS. 6A and 6B are cross-sectional views showing a method of forming a phosphor protective layer on a phosphor layer 112.
Figure 6B:
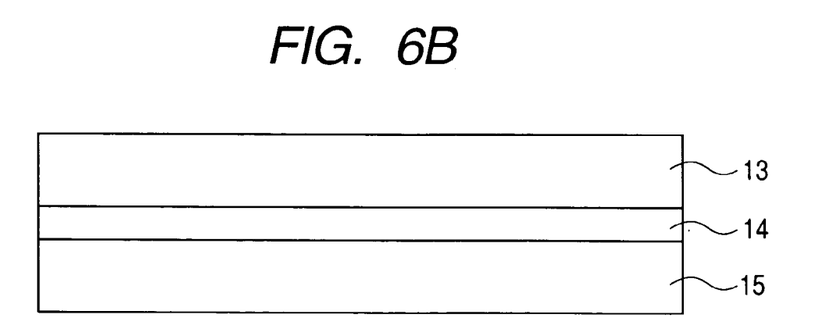
Figure 7A:
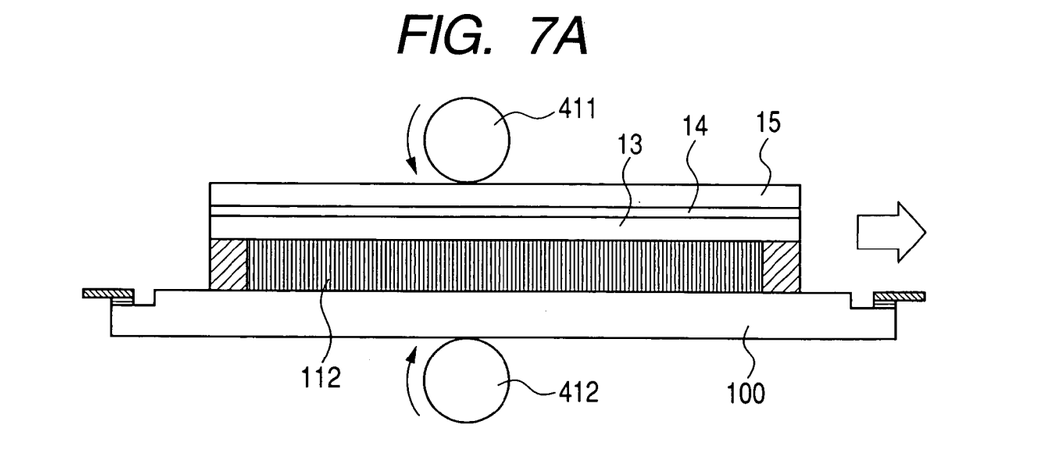
FIGS. 7A and 7B are cross-sectional views showing a method of forming a phosphor protective layer on a phosphor layer 112.
Figure 7B:
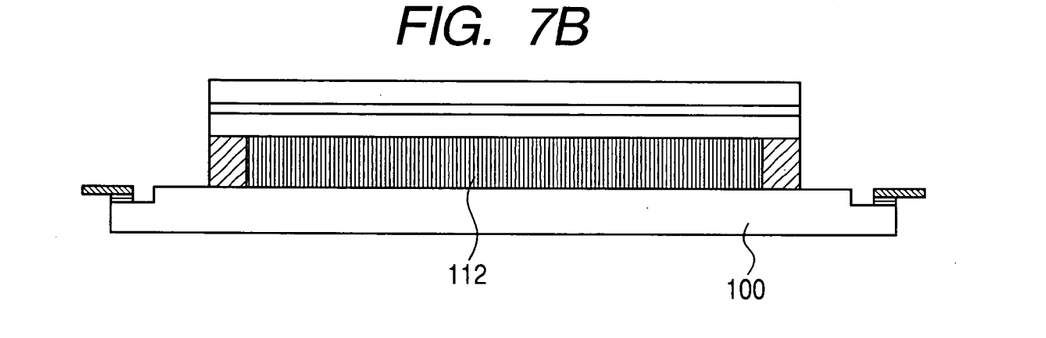

More specifically, as shown in FIGS. 6A and 6B, a hot-melt resin 401 in a molten state is prepared in tanks 402, 403 and a die coater 409, and also a laminate sheet constituted of a reflective layer 14 such as a metal foil or a metal evaporated film and a protective layer 15 for reflective layer is prepared in a roll form. Then, on the laminate sheet which is smoothed by smoothing rollers 404, 405, the molten hot-melt resin 401 is extrusion coated between molding rollers 406, 407 and is molded by the molding roller 407. It is then hardened by cooling with a cooling roller 408 and is cut into a predetermined size by cutting means 410. In this manner a phosphor protective layer 13 of the hot-melt resin is formed on the metal foil or metal evaporated film 14, thereby providing a phosphor protective sheet as shown in FIG. 6B. Then, as shown in FIG. 7A, the obtained phosphor protective sheet is placed on the phosphor undercoat layer 111 and the phosphor layer 112 of the sensor panel 100 and the hot-melt resin is fused by heating to a melting point or higher by a heat laminating roller 411. Then the radiation detection apparatus is moved by the heat laminating roller 411 and a conveying roller 412 in such a manner that the heat laminating roller 411 moves in relative manner on the phosphor layer 112, from a predetermined start position of the phosphor protective sheet on the frame member 11 to the frame member 11 at the other end, thereby executing a heat pressing. Then the radiation detection apparatus is rotated by 90° in its plane, and the heat laminating roller 411 is moved in relative manner on the phosphor layer 112, from a predetermined start position of the phosphor protective sheet on the frame member 11 to the frame member 11 at the other end, thereby executing a heat pressing. In this manner, the phosphor protective sheet is closely contacted with the phosphor layer 112 and the frame member 11 as shown in FIG. 7B. The heat laminating roller is regulated at a temperature within a range of 90-180° C., a rotating speed within a range of 0.01-1 m/min, and a pressure within a range of 1-50 kg/cm$^2$.

In the present embodiment, there has been explained, as the two-dimensional photodetector, a photoelectric converting portion formed by photosensors based on amorphous silicon and TFTs formed on a glass substrate. In the present invention, however, a similar radiation detection apparatus can be obtained by forming an undercoat layer and a phosphor layer, on a semiconductor single crystal substrate having an two-dimensional image pickup device such as a CCD or a CMOS sensor.

EXAMPLE 1

In the following, an example 1 of the radiation detection apparatus of the invention will be explained in detail.

As shown in FIG. 2, on a semiconductor film of amorphous silicon prepared on a substrate 101 such as glass, there were prepared a photoelectric converting portion (photoreceiving unit) constituted of photosensors (photoelectric converting elements) and TFTs. A sensor panel 100 was prepared by forming thereon a sensor protective layer (first protective layer) 105 of SiN$_x$ and a phosphor undercoat layer 111 of cured polyimide resin.

Then, as shown in FIG. 3, a frame member 11 of an epoxy resin was formed on the phosphor undercoat layer 111 in such a frame shape as to surround the two-dimensional photoelectric converting unit on the sensor panel, by coating with a dispensing apparatus with a width of 2 mm and a height of 0.5 mm, followed by curing. Then, as shown in FIG. 4, a phosphor layer 112 of an alkali halide phosphor of a columnar crystal structure (for example CsI:Tl (thallium-activated cesium iodide)) was formed by an evaporation apparatus for forming a phosphor layer. In this operation, the sensor panel 100 was set in such a manner that a holder portion for masking (masking member) 21 of the apparatus was positioned on a phosphor layer non-forming area such as the area of the connection lead 104 and that the holder portion 21 was in close contact with the frame member 11 (the holder portion being supported by the frame member so as to mask areas other than the phosphor layer forming area), and a phosphor layer 112 was formed evaporation. The phosphor layer 112 was formed with a thickness of 0.5 mm on the phosphor undercoat layer 111 so as to cover the upper surface of the two-dimensional photoelectric converting unit, and in contact with a lateral wall of the frame member 11 with a same height (FIG. 4).

Also, on a film-shaped sheet bearing an Al film as a reflective layer 14 on PET film as a protective layer 15 for reflective layer, a phosphor protective layer 13 of a hot-melt resin of a polyolefin resin was transferred and adhered by a heat roller onto a surface having the reflective layer, thereby obtaining a three-layered sheet (FIG. 6A). Such three-layered sheet was so positioned as to cover the phosphor layer 112 of the prepared sensor panel shown in FIG. 4 and that an external periphery of the three-layered sheet was placed on the upper surface of the frame member 11 and the surface of the phosphor protective layer 13 is opposed thereto, and a heat pressing was executed with a heat roller to fuse the phosphor protective layer 13 thereby achieving a fixation (FIGS. 7A and 7B). In this operation, the phosphor layer 112 was covered by the contact of the frame member 11 and the phosphor protective layer 13. In this manner a radiation detection apparatus of the present example (FIG. 1) was obtained.

The configuration of the present example, in which the phosphor layer is formed after forming a frame member on the sensor panel, can avoid influences of electrostatic charge to the photoelectric converting area or the wirings. It therefore enables a stable production with a high production yield. Also as the radiation detection apparatus of the present example does not required an expensive vacuum apparatus with a low film forming rate, such as a CVD apparatus, in the steps after the preparation of the sensor panel, constituent components can be prepared within a short time with an inexpensive apparatus, and the radiation detection apparatus can be provided with a low cost.

EXAMPLE 2

Figure 8:
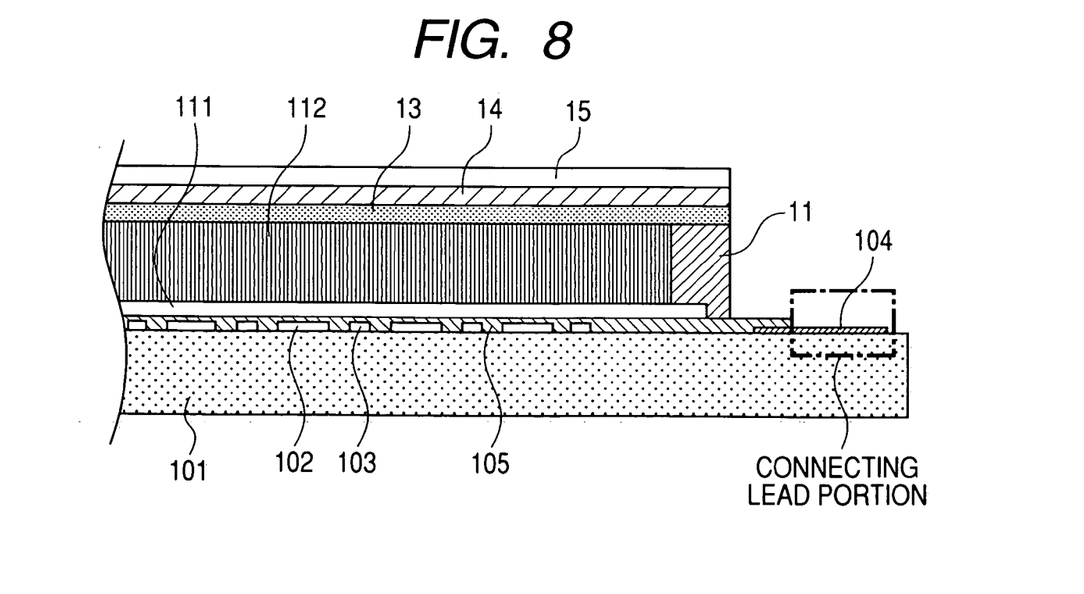
FIG. 8 is a cross-sectional view showing a radiation detection apparatus in a second embodiment of the present invention.

FIG. 8 is a schematic partial cross-sectional view showing a radiation detection apparatus of example 2. Components same as or equivalent to those of the prior example shown in FIG. 11 and those of the example 1 in FIGS. 1, 2, 3 and 4 are indicated by same numbers and will not be explained repeatedly or only be briefly explained.

Also in the radiation detection apparatus shown in FIG. 8, as in the example 1, a frame member 11 was formed by a dispensing apparatus or a screen printing apparatus in such a frame shape as to surround the two-dimensional photoelectric converting unit. Thereafter a phosphor layer 112 was formed by placing a holder for vacuum evaporation, and a phosphor protective layer 13 was positioned and fixed so as to be in contact with the surface of the phosphor layer 112 and the frame member 11.

In the present example, as will be apparent from FIG. 8, the frame member 11 on the sensor panel 100 was so provided as to be in contact with both a phosphor undercoat layer 111 on the sensor panel and a first protective layer 105. Effects similar to those of the example 1 could be obtained also in the radiation detection apparatus of the present example.

EXAMPLE 3

In the examples 1 and 2, the frame 11 formed on the sensor panel was formed with a height same as that of the phosphor layer 112. However the present invention is not limited to such case, and the phosphor layer 112 may be formed with a height larger or smaller than that of the frame member 11.

Figure 9:
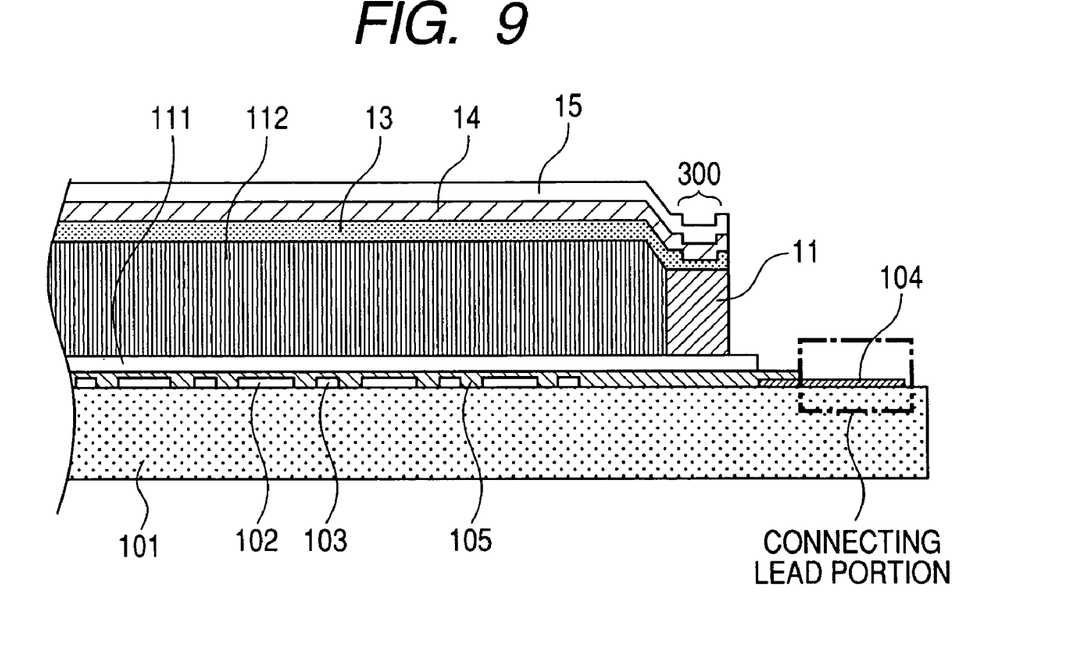
FIG. 9 is a cross-sectional view showing a radiation detection apparatus in a third embodiment of the present invention.

FIG. 9 is a schematic partial cross-sectional view of a radiation detection apparatus of the example 3, showing an example in which the phosphor layer 112 was formed higher than the frame member 11.

Figure 10:
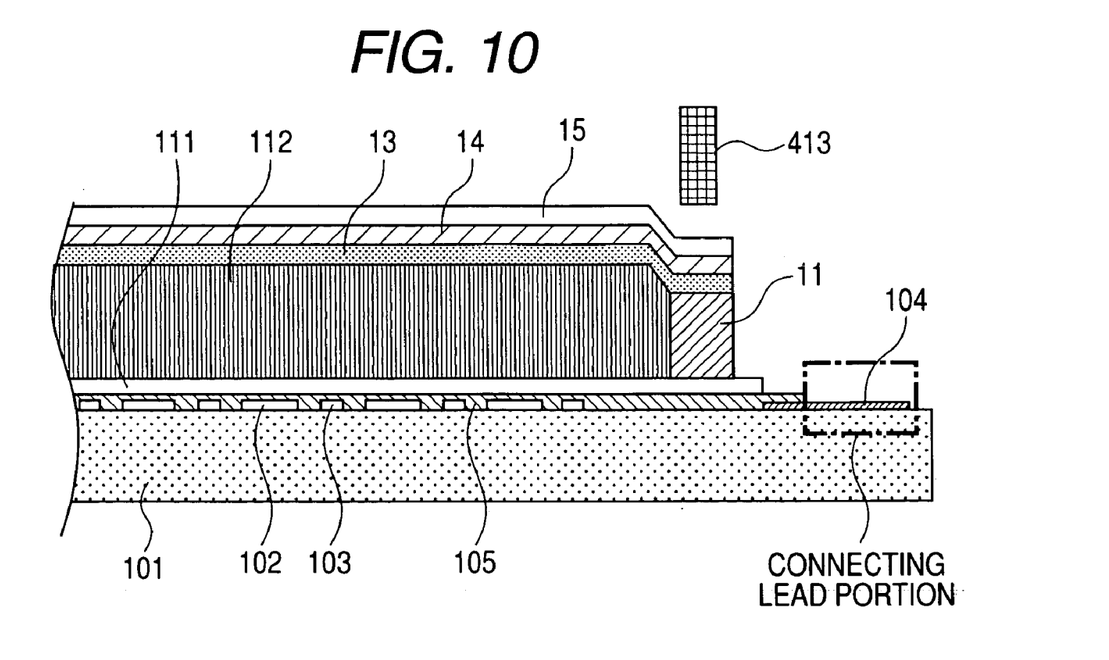
FIG. 10 is a cross-sectional view showing a method of forming heat seal portion (hot press portion)

In such case, when a phosphor protective layer 13 is formed by heat pressing with a heat roller as shown in FIG. 7A, the surface of the frame member 11 is positioned lower than the phosphor layer 112. Therefore, the pressure of the heat roller becomes weaker and a lower adhesion tends to result between the surface of the frame member 11 and the phosphor protective layer 13. Therefore, the adhesion was improved, as shown in FIG. 10, by thereafter executing a heat pressing (hot press) again on the phosphor protective layer 13 on the frame member 11 with a heat pressing head 413 of a bar type thereby forming a hot press portion 300. The hot press portion 300 of the present example may also be formed in a similar manner also in the example 1 (FIG. 1) or in the example 2 (FIG. 8) on the frame member of the radiation detection apparatus.

Such hot pressing has following effects. The adhesion of the phosphor protective layer 13 or the phosphor protective sheet having the phosphor protective layer 13, the reflective layer 14 and the protective layer 15 for reflective layer to the sensor panel is executed at a temperature corresponding to the melting point of the resin. However, small bubbles may be generated at the melting, and such bubbles lead to a local decrease of the adhesive power. A similar phenomenon may also take place in an end portion of the phosphor protective layer 5 or the phosphor protective sheet, and a decrease in the adhesive power may cause a moisture intrusion through an interface between the hot-melt resin and the sensor panel. Such moisture intrusion induces a deliquescence of the phosphor layer having the columnar crystal structure, leading to deteriorations in the light emission amount and the resolution, and an improvement in the adhesive power is therefore desirable.

The hot pressing at the end portion of the phosphor protective layer 13 is executed under a pressing at a temperature somewhat higher than the melting point of the resin for the purpose of improving the moisture resistance, and the resin is sufficiently fused by such heating. Thus, even if bubbles are generated, they are expelled to the exterior by the pressing, whereby a decrease in the adhesive power by the remaining bubbles is prevented. It is also possible, by thinning the adhesive layer in the end portion by the pressing, to narrow the channel of moisture intrusion from the exterior. Furthermore, the hot pressing improves the adhesive power between the frame member 11 and the phosphor protective layer 13 constituted of the hot-melt resin, thereby preventing a peeling by an external force and improving the moisture resistance.

In the hot press portion (heat seal portion) 300, the hot-melt resin has a smaller thickness. The hot pressing is executed, for example, at a pressure of 1-10 kg/cm$^2$, a temperature higher than a melt starting temperature of the hot-melt resin by 10-50° C., for a period of 1-60 seconds.

EXAMPLE 4

FIG. 11 illustrates an application of the radiation detection apparatus of the invention to an radiation image pickup system such as an X-ray diagnosis system.

An X-ray 6060 generated by an X-ray tube 6050 is transmitted by a chest 6062 of a patient or an inspected subject 6061, and enters a radiation detection apparatus (image sensor) 6040 as shown in FIG. 11. The entering X-ray contains information of the interior of the body of the patient 6061. In response to the entry of the X-ray, a scintillator (phosphor layer) emits light, which is photoelectrically converted by the photoelectric converting elements of the sensor panel to provide electrical information. This information is converted into digital signals, which are subjected to an image processing by an image processor 6070 serving as signal processing means, and can be observed on a display 6080 constituting display means in a control room.

Also such information can be transmitted to a remote location by transmission means such as a telephone line 6090, and can be displayed on a display 6081 serving as display means in a doctor room in another location or stored in recording means such as an optical disk, whereby enabling a diagnosis by a doctor in a remote location. It may also be recorded on a film 6110 by a film processor 6100 serving as recording means.

As explained in the foregoing, the present invention is applicable to a radiation image pickup system such as an X-ray sensor for medical use, but it is also effectively applicable to other purposes such as a non-destructive testing.

This application claims priority from Japanese Patent Application No. 2004-233423 filed on Aug. 10, 2004, which is hereby incorporated by reference herein.

What is claimed is:

1. A radiation detection apparatus comprising:
   a sensor panel, including a photoreceiving unit constituted of plural photoelectric converting elements two-dimensionally arranged on a substrate, and electrical connecting portions provided in an external portion of said photoreceiving unit and electrically connected to said photoelectric converting elements of respective rows or columns of said photoreceiving area;
   a phosphor layer provided at least on said photoreceiving unit for converting a radiation into a light detectable by said photoelectric converting element; and
   a phosphor protective member covering said phosphor layer and in contact with said sensor panel,
   wherein said phosphor protective member includes:
   a frame member provided between said phosphor layer and said electric connecting portion on said sensor panel; and
   a phosphor protective layer covering an upper surface of said phosphor layer and provided in close contact with an upper surface of said frame member, and
   wherein said phosphor protective layer includes, on the frame member, an area of which thickness is reduced by pressing process.

2. A radiation detection apparatus according to claim 1, wherein said phosphor protective layer is formed by a hot-melt resin.

3. A radiation detection apparatus according to claim 1, wherein said phosphor protective member further includes a reflective layer provided on said phosphor protective layer, and a protective layer for reflective layer provided on said reflective layer.

4. A radiation detection apparatus according to claim 1, wherein said phosphor layer is formed by a phosphor having a columnar crystalline structure, evaporated on said sensor panel.

5. A radiation detection apparatus according to claim 1, wherein the area included in said phosphor protective layer is press-adhered to said frame member by a heat pressing process.

6. A radiation image pickup system comprising:

a radiation detection apparatus according to claim 1;

signal processing means which processes a signal from said radiation detection apparatus;

recording means which records a signal from said signal processing means;

display means which displays a signal from said signal processing means;

transmission process means which transmits a signal from said signal processing means; and a radiation source for generating the radiation.

7. A producing method for a radiation detection apparatus comprising:

a step, on a sensor panel having a photoreceiving unit constituted of plural photoelectric converting elements two-dimensionally arranged on a substrate and electrical connecting portions provided in an external portion of the photoreceiving unit and electrically connected to the photoelectric converting elements of respective rows or columns of the photoreceiving unit, of forming a frame member between the photoreceiving unit and the electrical connecting portions;

a step of forming a phosphor layer, for converting a radiation into a light detectable by the photoelectric converting elements, on the sensor panel in an area surrounded by the frame member; and a step of forming a phosphor protective layer so as to cover an upper surface of the phosphor layer and in close contact with an upper surface of the frame member, wherein, after said step of forming the phosphor protective layer, a step of pressing the phosphor protective layer is executed to form, in the phosphor protective layer on the frame member, an area adhered to the frame member, wherein said step of pressing the phosphor protective layer is executed by a heat pressing process on the phosphor protective layer provided on the frame member.

8. A producing method for a radiation detection apparatus comprising:

a step, on a sensor panel having a photoreceiving unit constituted of plural photoelectric converting elements two-dimensionally arranged on a substrate and electrical connecting portions provided in an external portion of the photoreceiving unit and electrically connected to the photoelectric converting elements of respective rows or columns of the photoreceiving unit, of forming a frame member between the photoreceiving unit and the electrical connecting portions;

a step of forming a phosphor layer, for converting a radiation into a light detectable by the photoelectric converting elements, on the sensor panel in an area surrounded by the frame member; and a step of forming a phosphor protective layer so as to cover an upper surface of the phosphor layer and in close contact with an upper surface of the frame member, wherein, after said step of forming the phosphor protective layer, a step of pressing the phosphor protective layer is executed to reduce a thickness of an area of the phosphor protective layer on the frame member.

9. A producing method according to claim 7 or 8, wherein said step of forming the phosphor layer is a step of forming a phosphor layer having a columnar crystalline structure by an evaporation on the sensor panel.

10. A producing method according to claim 7 or 8, wherein said step of forming the phosphor protective layer includes a process of adhering a film sheet provided with a protective layer for reflective layer, a reflective layer and the phosphor protective layer, and the sensor panel on which the frame member and the phosphor layer are formed, at the phosphor protective layer.

11. A producing method according to claim 7 or 8, wherein said step of forming the phosphor layer of the columnar crystalline structure is executed by positioning a mask member, for masking an area other than the forming area of the phosphor layer, in such a manner that the mask member is supported by the frame member.

12. A producing method according to claim 7 or 8, wherein the phosphor protective layer is formed by a hot-melt.

* * * * *